United States Patent
Mateos Sole

(10) Patent No.: US 9,843,642 B2
(45) Date of Patent: Dec. 12, 2017

(54) GEO-REFERENCING MEDIA CONTENT

(71) Applicant: Dolby International AB, Amsterdam Zuidoost (NL)

(72) Inventor: Antonio Mateos Sole, Barcelona (ES)

(73) Assignee: Dolby International AB, Amsterdam (NL)

( * ) Notice: Subject to any disclaimer, the term of this patent is extended or adjusted under 35 U.S.C. 154(b) by 403 days.

(21) Appl. No.: 14/601,721

(22) Filed: Jan. 21, 2015

(65) Prior Publication Data

US 2015/0215410 A1    Jul. 30, 2015

Related U.S. Application Data

(60) Provisional application No. 61/972,777, filed on Mar. 31, 2014.

(30) Foreign Application Priority Data

Jan. 28, 2014  (ES) .................................. 201430100

(51) Int. Cl.
*G06F 15/16* (2006.01)
*H04L 29/08* (2006.01)

(52) U.S. Cl.
CPC .................................. *H04L 67/18* (2013.01)

(58) Field of Classification Search
CPC ...................................................... H04L 67/18
See application file for complete search history.

(56) References Cited

U.S. PATENT DOCUMENTS

| | | | |
|---|---|---|---|
| 8,108,144 B2 | 1/2012 | Christie | |
| 8,428,621 B2 | 4/2013 | Vorbau | |
| 8,494,564 B2 | 7/2013 | Narayan | |
| 2009/0179895 A1* | 7/2009 | Zhu | G06F 17/30241 345/424 |
| 2010/0076968 A1 | 3/2010 | Boyns | |

(Continued)

FOREIGN PATENT DOCUMENTS

| | | |
|---|---|---|
| CN | 102685675 | 9/2012 |
| KR | 2013-0029182 | 3/2013 |

OTHER PUBLICATIONS

Wang, S. et al. "Adaptive Mobile Cloud Computing to Enable Rich Mobile Multimedia Applications" IEEE Transactions on Multimedia, Jun. 2013, pp. 870-883, vol. 15, Issue 4.

(Continued)

*Primary Examiner* — June Sison
*Assistant Examiner* — Steven Nguyen

(57) ABSTRACT

Geo origination data is generated for a geo-tagged media device of a user from measurements performed by sensors. The geo origination data is sent to a server system. At the server system, geo-tagged media content elements are selected based on the geo origination data. Further, based on the selected geo-tagged media content elements and the geo origination data, geo-referenced rendering data to be used for rendering media content from the selected geo-tagged media content elements perceivable to the user of the geo-tagged media device is generated. The geo-referenced rendering data can be streamed to the geo-tagged media device along with media content derived from the geo-tagged media content elements for rendering at the geo-tagged media device.

28 Claims, 8 Drawing Sheets

(56) References Cited

U.S. PATENT DOCUMENTS

| | | | |
|---|---|---|---|
| 2010/0191459 A1* | 7/2010 | Carter | G01C 21/32 |
| | | | 701/532 |
| 2011/0143667 A1 | 6/2011 | Cugnini | |
| 2011/0145718 A1* | 6/2011 | Ketola | G06F 3/04815 |
| | | | 715/739 |
| 2011/0165888 A1* | 7/2011 | Shuman | G06F 17/30041 |
| | | | 455/456.1 |
| 2011/0283223 A1* | 11/2011 | Vaittinen | G01C 21/3647 |
| | | | 715/781 |
| 2012/0066704 A1 | 3/2012 | Agevik | |
| 2012/0131178 A1 | 5/2012 | Zhu | |
| 2012/0214465 A1 | 8/2012 | Picconelli | |
| 2013/0067035 A1* | 3/2013 | Amanat | G06Q 30/02 |
| | | | 709/219 |
| 2013/0073581 A1 | 3/2013 | Sandholm | |
| 2013/0178241 A1 | 7/2013 | Duggirala | |
| 2013/0178965 A1 | 7/2013 | Baalu | |
| 2014/0245157 A1* | 8/2014 | Biniak | G06Q 30/0261 |
| | | | 715/733 |
| 2014/0285519 A1* | 9/2014 | Uusitalo | G06T 19/006 |
| | | | 345/633 |

OTHER PUBLICATIONS

Rahman, K.M. et al. "Location Based Early Disaster Warning and Evacuation System on Mobile Phones Using OpenStreetMap" IEEE Conference on Open Systems, Oct. 21-24, 2012, pp. 1-6.

Narula, A. et al. "Context Profiling Based Multimedia Service on Cloud" IEEE International Symposium on Multimedia, Dec. 10-12, 2012, pp. 386-393.

Zhao, X. et al. "Secure Cloud-Assisted Location Based Reminder" Proc. of the 8th ACM SIGSAC Symposium on Information. Computer and Communications Security, pp. 323-328, 2013.

Lee, Dong Woo, et al "Geopot: a Cloud-Based Geolocation Data Service for Mobile Applications" Jul. 5, 2011, pp. 1283-1301, International Journal of Geographical Information, published by Taylor & Francis Group.

* cited by examiner

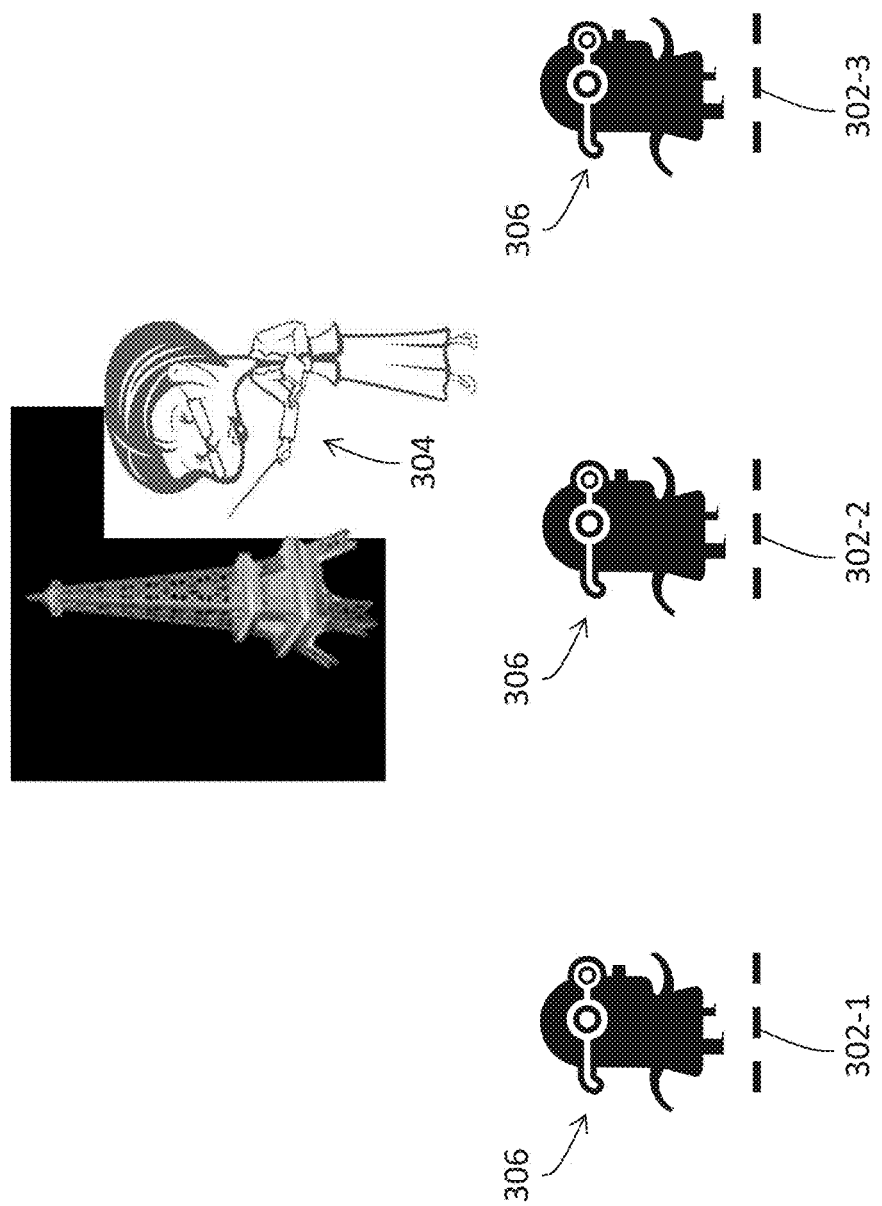

GEO-REFERENCING MEDIA CONTENT

CROSS REFERENCE TO RELATED APPLICATIONS

This application claims the benefit of priority to Spanish Patent Application No. P201430100 filed Jan. 28, 2014 and U.S. Provisional Application No. 61/972,777 filed Mar. 31, 2014 which is incorporated herein by reference in its entirety.

TECHNOLOGY

The present invention pertains generally to processing media content and pertains more specifically to techniques that may be used to render spatial media content in relation to a user's geo location.

BACKGROUND

In recent years, mobile devices have witnessed a massive deployment. A large number of mobile devices include sensors that support determining geo locations and orientations of the devices. In the cases where a device moves rigidly with a user's head, such as in the case of smart glasses, it is also possible to derive the user's head orientation from geo location and sensor data collected by the device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A and FIG. 3B illustrate example scenarios in which geo-referenced media content is streamed to geo-tagged media devices;

DESCRIPTION OF EXAMPLE EMBODIMENTS

Figure 1A:
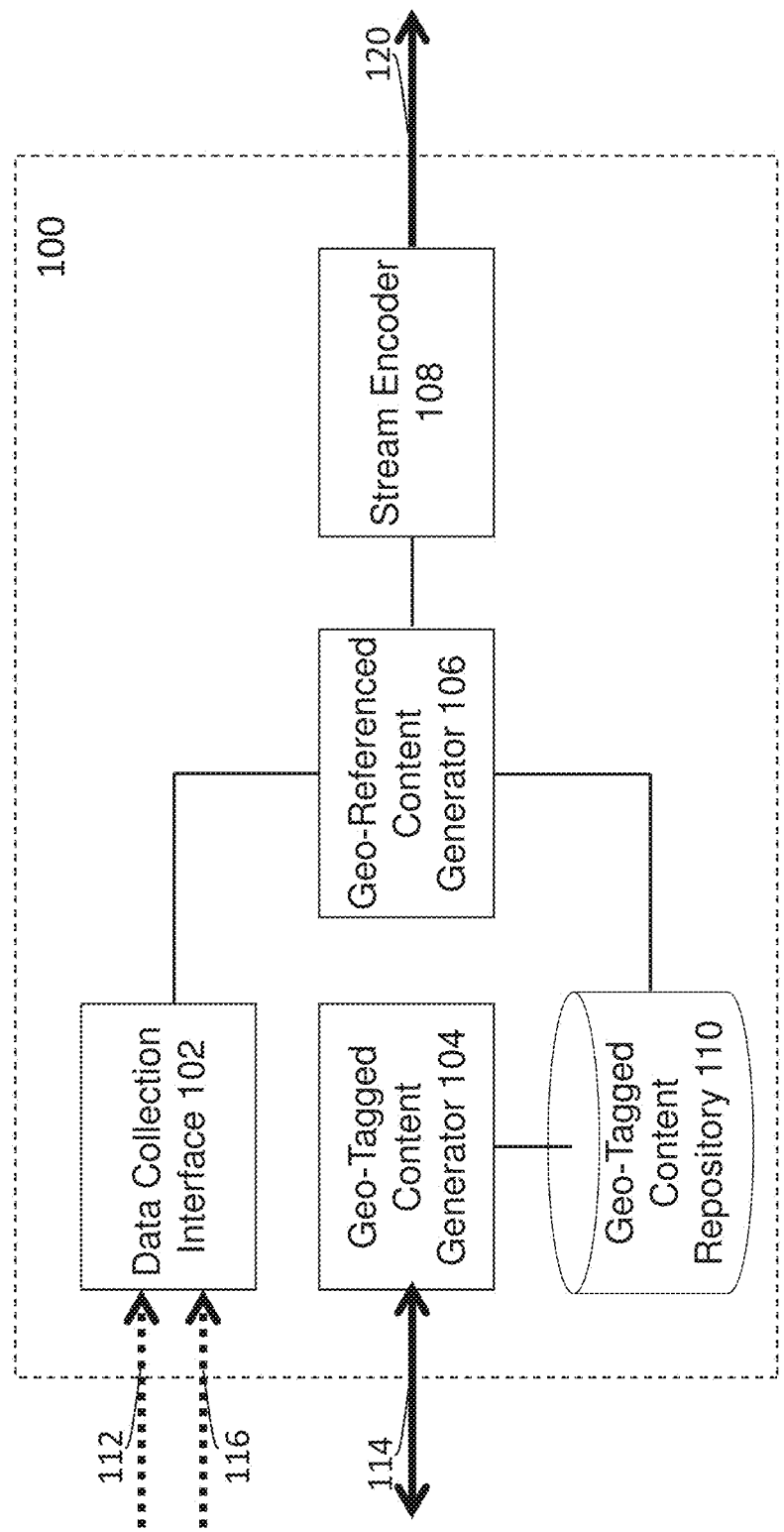
FIG. 1A and FIG. 1B illustrate an example cloud-based media content provider system and an example geo-tagged media device, respectively.

Example embodiments, which relate to rendering spatial media content in relation to a user's geo position, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Cloud-Based Media Content Provider Systems
3. Geo-Tagged Media Devices
4. Geo-Tags
5. Rendering of Geo-Referenced Media Content
6. Geo-Referenced Rendering Data
7. Example System and Process Flows
8. Implementation Mechanisms—Hardware Overview
9. Equivalents, Extensions, Alternatives and Miscellaneous

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Media content elements as described herein may be configured/preconfigured with geo-tags and stored in a cloud-based media content provider system. The geo-tags can be associated or assigned with the media content elements statically, dynamically, before or at the time of downloading, before or at the time of rendering, etc. These media content elements may be referred to as geo-tagged media contents.

A geo-tag assigned to a media content element may refer to zero, one or more selection criteria with which the media content element becomes selectable if the selection criteria are satisfied based on geo origination data and/or non-locational sensor data collected from the geo-tagged media device. Selected geo-tagged media content elements can be used to generate geo-referenced media content elements that are streamed to geo-tagged media devices. Specifically, a geo-referenced media content element can be dynamically generated based on one or more selected geo-tagged media content elements, geo origination data and/or non-locational sensor data collected from one or more geo-tagged media devices. A geo-tagged media device refers to a media device that is configured with one or more sensors and/or other components to collect geo origination data and/or non-locational sensor data in relation to the media device.

In some embodiments, specific selection criteria may be configured with geo-tags such that one or more geo-tagged media content elements assigned with these geo-tags cover a plurality of geo locations of a place, a state, a country, a continent, etc. Examples of geo locations that can be covered by geo-tagged media content elements may include but are not limited to: any of squares such as major squares of major cities, etc., theaters, shopping malls, tourist attractions, museums, monuments, amusement parks, lodgings, historical places, nature trails, universities, etc.

In some embodiments, geo-tagged media content elements stored in the cloud-based provider system include a plurality of different media content types. Examples of media content types may include but are not limited to: any of personal audio or audiovisual messages, commercial audio or audiovisual messages, tourist guide information, computer games, movies, concert recordings, Spiderman sound and/or images, Superman sound and/or images, audio or audiovisual content of actors, singers, musicians, dancers, etc., computer-generated graphics, animation figures, avatars, etc.

In some embodiments, geo-tagged media content elements stored in the cloud-based provider system support a plurality of different media device types. Examples of media device types may include but are not limited to: any of mobile devices, handsets, tablet computers, laptops, personal computers, wearable media devices, eyeglass-based computing devices, etc.

In some embodiments, a geo-tagged media device that a user carries is equipped, interlinked, etc., with one or more sensors to collect geo origination data and/or non-locational sensor data in real time or in near real time. Additionally, the geo-tagged media device can be configured to render audio (e.g., to head-phones worn by the user) and/or to render images (e.g., to a display integrated with the geo-tagged media device or connected with the geo-tagged media device, etc.). In some embodiments, the geo-tagged media device can be configured (e.g., by the user, through a running application on the geo-tagged media device started by the user, etc.) to share the geo origination data and/or non-locational sensor data with one or more cloud-based media content provider systems.

A cloud-based media content provider system can generate geo-referenced media content elements, which are to be streamed to geo-tagged media devices of a variable number of users, from selected geo-tagged media content elements, as functions of geo origination data and/or non-locational sensor data collected from the geo-tagged media devices of these users. The geo-referenced media content elements can be then rendered by the geo-tagged media devices, for example, as functions of the time-dependent geo origination data (e.g., geo locations such as GPS coordinates, orientations such as head orientations, etc.) and/or the non-locational sensor data.

In some embodiments, while a geo-referenced media content element is being rendered on a media device to a user, the position of the geo-referenced media content element may be represented at a fixed location, for example, relative to a user's geo location. For instance, tourist information may be provided by a geo-referenced media content element representing a tourist guide at or near a fixed distance from a user to inform the user about the Eiffel tower so long as the user is sufficiently geographically close to the Eiffel tower.

In some embodiments, to create a spatially diverse, immersive and accurate media experience for users with geo-tagged media devices, a represented position of a geo-referenced media content element in rendering may be dynamically determined as a function of geo origination data (e.g., geo location, orientation, etc.) and non-locational sensor data collected from the geo-tagged media devices. Dynamically determined positions of geo-referenced media content elements may be used to deliver a coherent and self-consistent rendering of media content contained in the geo-referenced media content elements, such that a scene, figure, object, sound source, etc., appears coherently and realistically to each individual user in a media experience supported by one or more cloud-based media content provider systems. In particular, a geo-referenced media content item can be represented to a user in rendering in a manner that is consistent with the user's respective geo location, (e.g., head, etc.) orientation, etc.

For example, as a user walks to or near a geo location specified by a geo tag of a geo-tagged media content element, (e.g., 2-D, 3-D, etc.) sound of the media content element may become louder, (e.g., 2-D, 3-D, etc.) and images from the media content element may become larger. As the user turns away from the geo location, the sound and images may change in relation to the user's geo location and (e.g., head, etc.) orientation to represent the location of the sound and images as the same geo location from which the user turns away. As the user walks away from the geo location specified for the media content element, the sound from the media content element may become less loud, and the images from the media content element may become smaller. At some point at which the media content element is sufficiently away from the user, the media content element may be abstracted with a symbol on a display (e.g., a bubble on a wearable eye glass display, etc.) viewable by the user or may even disappear.

A "geo-referenced" media content element refers to a media content element that comprises media content from corresponding geo-tagged media content elements and geo-referenced rendering data generated based on the corresponding geo-tagged media content elements, geo origination data and/or non-locational sensor data from a geo-tagged media device, etc. The media content in the geo-referenced media content element, as derived from that of the corresponding geo-tagged media content elements, can be rendered using the geo-reference rendering data in reference to (e.g., in relation to, in dependence with, etc.) the geo origination data and/or non-locational sensor data from the geo-tagged media device.

In some embodiments, the geo-referenced rendering data comprises (or captures) a number of rendering relationships among different entities such as geo-tagged media content elements, users, devices, user actions, external conditions (for example, as indicated by non-locational sensor data), etc. Examples of rendering relationships captured in the geo-referenced rendering data may include but are not limited to: any of rendering relationships i) among different geo-tagged media content elements; ii) between geo-tagged media content elements and a set of potential user actions; iii) between geo-tagged media content elements and external data; etc.

In some embodiments, a set of geo-tagged media content elements are assigned to a group media experience in which multiple users can participate. Examples of group media experience may include but are not limited to: any of group based games, group dancing, group singing, etc. Geo-referenced media content elements (e.g., dancers, game players, game caricatures, famous personalities, etc.) constructed from the set of geo-tagged media content elements can be streamed to the set of users according to the users' respective actions, geo locations, orientations, etc., as determined from sensors in the users' media devices. In some embodiments, the streamed media content elements are rendered by the media devices to the users' displays using 2-dimensional (2-D) or 3-dimensional (3-D) display techniques and/or to the users' head-phones using 2-D or 3-D audio techniques (e.g., binaural technologies, etc.) in a manner that the media content elements are perceived by each of the users as being rendered at perceptually correct positions relative to each user's respective position and/or (e.g., head, etc.) orientation. Additionally, optionally, or alternatively, visual characteristics, loudness levels, etc., associated with (e.g., pre-configured with, defaults for, etc.) the geo-tagged media content elements can be modified to generate the geo-referenced media content elements to be streamed to the users' geo-tagged media devices, in order to reproduce/portray correct object-to-user distances, correct object-to-user motions, etc.

In some embodiments, mechanisms as described herein form a part of a media processing system, including but not limited to: an audiovisual device, a handheld device, a wearable device, game machine, television, home theater system, tablet, mobile device, laptop computer, netbook computer, cellular radiotelephone, electronic book reader, point of sale terminal, desktop computer, computer workstation, computer kiosk, a flat panel TV, various other kinds of terminals and media processing units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Cloud-Based Media Content Provider Systems

FIG. 1A illustrates an example (e.g., cloud-based, etc.) media content provider system 100. The media content provider system 100 may comprise a data collection interface 102, a geo-tagged content generator 104, a geo-tagged content repository 110, a geo-referenced content generator 106, and a stream encoder 108. The media content provider system 100 may be a part of an internet-based that is in communication with one or more geo-tagged media devices (e.g., 150 of FIG. 1B, etc.) over one or more (e.g., wireless, wire-line, etc.) network links. The media content provider system 100 can be configured to receive geo origination data and/or non-locational sensor data from the geo-tagged media devices; select geo-tagged media content elements; generate geo-referenced media content elements based on the selected geo-tagged media content elements, the geo origination data, non-locational sensor data, etc.; stream geo-referenced media content elements to the geo-tagged media devices.

In some embodiments, the geo-tagged content repository (110) such as a relational database system, an object-based database system, data storages, etc., is configured to store one or more geo-tagged media content elements, which may include but are not limited to: any of those received from the geo-tagged content generation interface 114, etc.

In some embodiments, the geo-tagged content generator (104) is configured to generate geo-tagged media content elements and store the geo-tagged media content elements in the geo-tagged content repository (110). For example, the geo-tagged content generator (104) can be configured to interact with one or more users, applications, media devices, external system, etc., over a geo-tagged content generation interface 114 to compose, modify, send, receive, upload, download, etc., media content, geo-tags, etc. One or more geo-tagged media content elements may then be generated based at least in part on the media content, geo-tags, etc., and stored in the geo-tagged content repository (110).

Media content in a geo-tagged media content element or a geo-referenced media content element, as described herein, may comprise audio data only, audiovisual data, etc., such as visual images, video frames, 2D video images, 3D images, multi-view images, audio sample data, a sound track, multi-channel audio data, audio objects, etc. One, two or more geo-tagged media content elements, or corresponding geo-referenced media content elements generated therefrom, can be time-synchronized (e.g., based on timestamp, frame index, etc.) by the geo-tagged content generator (104) with one another, with data collected by the data collection interface (102), etc. One, two or more geo-tagged media content elements, or corresponding geo-referenced media content elements generated therefrom, may be spatially correlated (e.g., collocated, adjacent, grouped, aligned in the same spatial perspective, with respective positions in a spatial configuration as a single performer group, etc.) with one another, with data collected by the data collection interface (102), etc. Zero, one or more geo-tagged media content elements, or corresponding geo-referenced media content elements generated therefrom, may not be time-synchronized or spatially correlated with one another, with data collected by the data collection interface (102), etc.

Geo-tagged media content elements as described herein may further comprise geo tags that specify zero, one or more selection criteria that can be used to determine whether a specific geo-tagged media content element should be selected for a geo-tagged media device (e.g., 150 of FIG. 1B, etc.) or a user of the geo-tagged media device based on geo origination data received from the geo-tagged media device. For example, geo locations, orientations, external conditions, etc., in geo origination data received from one or more geo-tagged media devices (e.g., 150 of FIG. 1B, etc.) may be compared with respective selection criteria of one or more geo-tagged media content elements to determine whether any of the one or more geo-tagged media content elements should be selected for generating geo-referenced media content to be streamed to the one or more geo-tagged media devices.

In some embodiments, the data collection interface (102) is configured to collect or receive (e.g., live, real time, near real time, etc.) geo origination data 112, (e.g., live, real time, near real time, etc.) non-locational sensor data 116, etc. For example, the data collection interface (102) may be used to collect the geo origination data (112), the non-locational sensor data (116), etc., from geo-tagged media devices (e.g., 150 of FIG. 1B, etc.) at a tourist attraction (e.g., FIG. 3A, etc.), a park (e.g., FIG. 3B, etc.), etc.

The geo origination data (112) comprises geo locational data based on sensor measurements related to geo locations, orientations, velocities, accelerations, etc., as collected from the geo-tagged media devices. The non-locational sensor data (116) comprises non-geo locational data based on sensor measurements related to one or more of temperature measurements by a geo-tagged media device (e.g., 150 of FIG. 1B, etc.), physiological measurements on a user of a geo-tagged media device (e.g., 150 of FIG. 1B, etc.), heart rate measurements on a user of a geo-tagged media device (e.g., 150 of FIG. 1B, etc.), etc., as collected from the geo-tagged media devices. A given type (e.g., geo-positions, orientations, velocities, temperature, pressure etc.) of the geo origination data (112) or the non-locational sensor data (116) can be represented by time-dependent (e.g., time-varied, etc.) data objects, functions, tables, sequences, etc.

In some embodiments, a geo-tagged media device (e.g., 150 of FIG. 1B, etc.) as described herein comprises, or works in conjunctions with, one or more sensors that perform measurements of geo locations, orientations, external conditions, etc., at or near the geo-tagged media device. The geo-tagged media device may be configured to determine a geo location of the geo-tagged media device or a user of the geo-tagged media device with geo positional location technologies such as GPS, Galileo, GLONASS, BeiDou, etc., determine an orientation of the user with accelerometer, magnetometer, etc., determine velocity, acceleration, temperature, ambient light, humidity, air pressure, etc., with various sensors, etc. Some or all of the measurements obtained by the geo-tagged media device through the sensors may be sent from the geo-tagged media device to the data collection interface (102) over one or more network links as a part of the geo origination data (112), non-locational sensor data (116), etc.

In some embodiments, the geo-referenced content generator (106) is configured to analyze the geo origination data (112), the non-locational sensor data (116), etc.; use results from the analyses to determine one or more (e.g., time-varying, fixed, etc.) of geo locations as positions of one or more users, orientations of the one or more users, external conditions at or near the geo locations, etc.; retrieve one or more geo-tagged media content elements from the geo-tagged content repository (110) based at least in part on the one or more of geo locations of the users, orientations of the users, external conditions at or near the users, etc.; establish or generate one or more rendering relationships among entities such as the geo-tagged media content elements, the one or more users, external conditions, etc.; generate one or more geo-referenced media content elements based on the geo-tagged media content elements retrieved from the geo-tagged content repository (110), the rendering relationships, etc.; provide the one or more geo-referenced media content elements to the stream encoder (108) for encoding into output media data streams; etc.

A rendering relationship in geo-referenced rendering data as described herein can be represented by time-dependent (e.g., time-varied, etc.) data object, functions, tables, sequences, etc. In some embodiments, rendering relationships, which are dynamically generated/determined in response to receiving geo origination data collected from geo-tagged media devices (e.g., 150 of FIG. 1B, etc.), may include but are not limited only to: any of a distance, an angle (e.g., relative to a reference such as a geo location at which a user is located, etc.), a relative velocity, etc. between a geo-tagged media content element and a geo-tagged media device (e.g., 150 of FIG. 1B, etc.) or a user thereof.

In some embodiments, in which multiple users participate a group media experience participated by multiple users including at least a first user and a second user, it should be noted that one or more geo-referenced media content elements may be generated by the media content provider system (100) to represent one of the first user or the second user to the other of the first user or the second user. For example, audio feeds may be received as a part of non-locational sensor data (116) by the data collection interface (102) from the first user and the second user. These audio feeds, along with geo origination data that comes with the audio feeds, may be dynamically turned into geo-referenced media content elements by the media content provider system (100) or by the geo-referenced content generator (106) therein. The media content provider system (100) can be configured to concurrently stream to the first user's geo-tagged media device (e.g., a first instance of 150 of FIG. 1B, etc.) first geo-referenced media content that includes one or more first geo-referenced media content elements generated based on audio feeds received from the second user's geo-tagged media device (e.g., a second instance of 150 of FIG. 1B, etc.) and/or from geo-tagged media devise of users other than that of the first user, stream to the second user's geo-tagged media device second geo-referenced media content that includes one or more second geo-referenced media content elements generated based on audio feeds received from the first user's geo-tagged media device and/or from geo-tagged media devise of users other than that of the second user, etc.

It should be noted that a variety of media data types (e.g., video images, avatars, computer generated images, text messages, signals, etc.), not necessarily audio data types, may be provided as geo-referenced media content (e.g., to represent other users to another user in a group media experience, etc.). For example, a geo-tagged media device (e.g., 150 of FIG. 1B, etc.) may comprise or work in conjunction with a (e.g., 2-D, 3-D, etc.) camera that is generating video images at or near a user. Geo-origination data as sent by the geo-tagged media device to the data collection interface (102) may be used by the media content provider system (100) to determine a perspective (which may be the same as, or correlated with an orientation of a user of the geo-tagged media device) of the camera. Video images received as a part of non-locational data (116) by the data collection interface (102) may be used to generate one or more geo-referenced media content elements that can be streamed to one or more geo-tagged media devices (e.g., 150 of FIG. 1B, etc.).

Alternatively, optionally, or additionally, in some embodiments, geo-referenced media content elements streamed to one or more geo-tagged media devices (e.g., 150 of FIG. 1B, etc.) may comprise zero, one or more elements that represent commercial ads for a variety of services (e.g., fitness centers, hospitals, veterinarians, dentists, etc.), products (e.g., clothing, foods, cars, etc.), etc., that are available at one or more geo locations of the one or more geo-tagged media devices. In some embodiments, a commercial ad may be integrated as a part of an overall geo-referenced media content element that also includes non-commercial media content. In some embodiments, a commercial ad may be separate from non-commercial geo-referenced media content elements. In some embodiments, a commercial ad may be represented by a graphic symbol (e.g., portrayed as a bubble at a particular distance, orientation, etc., from a user, etc.) rendered on a display of a geo-tagged media device (e.g., 150 of FIG. 1B, etc.). In some embodiments, a commercial ad may be represented at a display as a selectable icon; upon a selection of the icon by a user, additional media content (e.g., audio only, visual only, audiovisual, etc.) may be rendered as a part of the commercial ad with the user's geo-tagged media device.

In some embodiments, a geo-referenced media content element streamed to a geo-tagged media device (e.g., 150 of FIG. 1B, etc.) may comprise one or more (e.g., time, geo locational, condition-dependent, etc.) indicators indicating as to when, where, upon what conditions, how long, etc., media content in the geo-referenced media content element should be played back at the geo-tagged media device. These indicators can be set so that geo-referenced media content elements can be played back or rendered in response to detecting rendering triggers (e.g., actions, conditions, etc.) occurring live in a media experience.

Alternatively, optionally, or additionally, in some embodiments, the geo-referenced content generator (106) may dynamically modify rendering properties of, or rendering relationships involving, geo-referenced media content elements at a given time. Such dynamic modifications may be made, for example, based on time-dependent information (e.g., time-synchronous information, etc.) from one or more of the geo origination data (112), the non-locational sensor data (116), rendering relationships established by the geo-referenced content generator (106), etc.

In some embodiments, geo-tagged media content elements retrieved from the geo-tagged content repository (110) may be modified, enhanced, position- and/or orientation-shifted, etc., based on some or all of the geo origination data (112), the non-locational sensor data (116), the rendering relationships generated by the geo-referenced content generator (106), etc., so that geo-referenced media content elements—representing the geo-tagged media content elements as modified, enhanced, position- and/or orientation—shifted, etc., in relation to the geo origination data (112), the non-locational sensor data (116), the rendering relationships, etc.—can be rendered by a downstream device in a spatially correct manner relative to each of one or more users in a media experience.

Figure 1B:
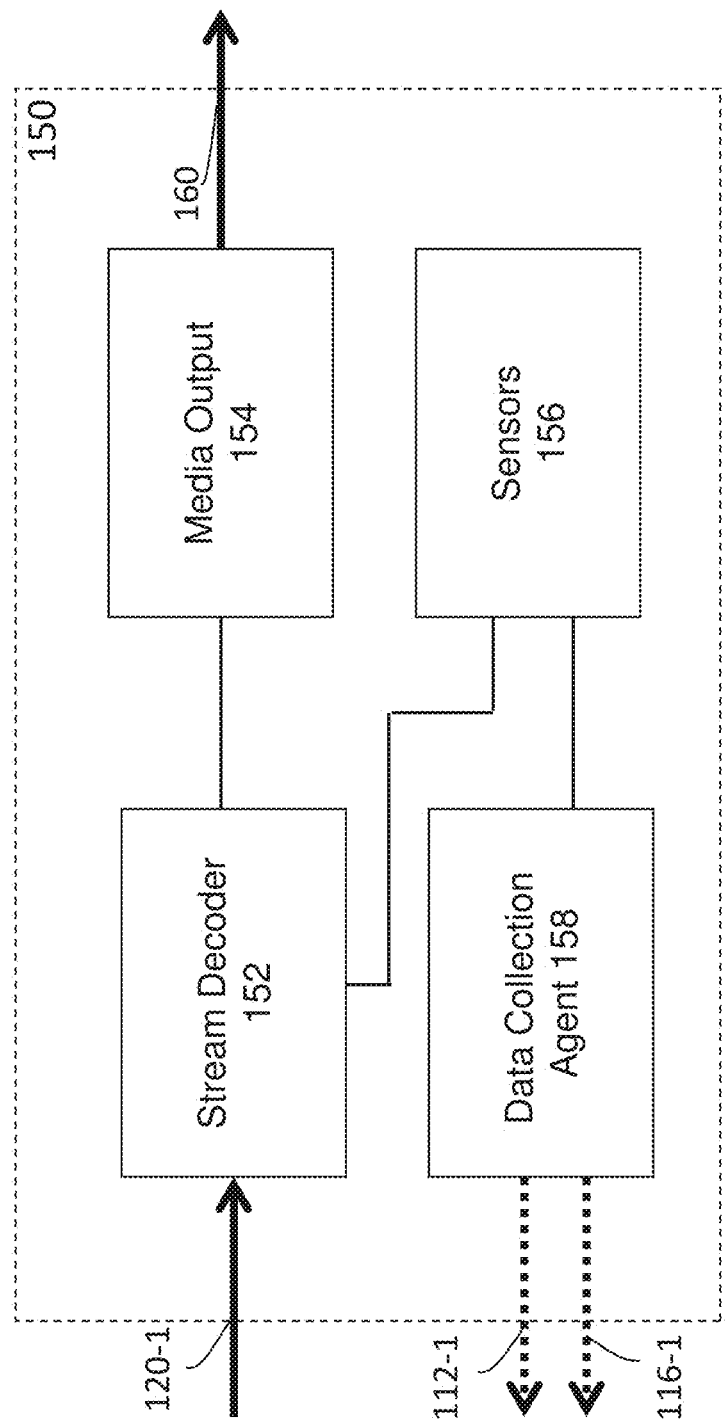

In some embodiments, the stream encoder (108) is configured to receive the geo-referenced media content elements from the geo-referenced content generator (106), to encode the geo-referenced media content elements into one or more media data streams (120), to transmit the one or more media data streams (120) to one or more geo-tagged media devices (e.g., 150 of FIG. 1B, etc.).

As described herein, a media data stream can be audio or audiovisual. The media data stream can be transmitted or received through one or more wireless or wired network links. A media data stream may be communicated through an intermediary such as one or more of network connections, USB connections, wide area networks, local area networks, wireless connections, optical connections, buses, crossbar connections, serial connections, etc.

3. Geo-Tagged Media Devices

FIG. 1B illustrates an example geo-tagged media device 150. The geo-tagged media device 150 may comprise a stream decoder 152, a media output 154, one or more sensors 156, a data collection agent 158, etc. In some embodiments, the geo-tagged media device (150) may comprise or interoperate with additional units such as one or more of displays, speakers, microphones, etc. In some embodiments, some or all components of the geo-tagged media device 150 may be a part of, or operate in conjunction with, a playback device (e.g., a wearable computing device, a tablet computer, etc.). In some embodiments, some or all components of the geo-tagged media device 150 may be in one or more separate housing or separate chasses.

In some embodiments, the one or more sensors (156) are configured to perform physical, electrical, optical, mechanical, etc., measurements. These measurements may be selected/aggregated by the data collection agent (158) to generate (e.g., live, real time, near real time, etc.) geo origination data 112-1, (e.g., live, real time, near real time, etc.) non-locational sensor data 116-1, etc. The geo origination data 112-1 of FIG. 1B may represent a part of the geo origination data 112 of FIG. 1A, while the non-locational sensor data 116-1 of FIG. 1B may represent a part of the non-locational sensor data 116 of FIG. 1A. The geo-tagged media device (150), or the data collection agent (158) therein, may send the geo origination data (112-1), the non-locational sensor data (116-1), etc., to a cloud-based media content provider system (e.g., 100 of FIG. 1A).

The geo origination data (112-1) may include but are not limited to: any of geo locational sensor measurements (e.g., geo locations, orientations, velocities, accelerations, etc.). The non-locational sensor data (116-1) may include but are not limited to: any of non-geo locational sensor measurements such as one or more of audio feeds, video feeds, physical (e.g., temperature, wind speed, pressure, displacements, velocities, accelerations, etc.) measurements by a geo-tagged media device, optical (e.g., ambient light, etc.) measurements, physiological measurements on a user of a geo-tagged media device, heart rate measurements on a user of a geo-tagged media device, etc.

In some embodiments, the stream decoder (152) is configured to receive a media data stream 120-1 (which may be a part of the media data streams 120), and decode at least a portion of the media data stream (120-1) into one or more geo-referenced media content elements. In some embodiments, the stream decoder (152) may be further configured to receive sensor data from the one or more sensors (156). The sensor data received by the stream decoder (152) may include but is not limited to the geo-origination data (e.g., current orientation, current position, etc.). The stream decoder (152) can be configured to take into consideration the geo-origination data in decoding and adapting the one or more geo-referenced media content elements for rendering with the geo-tagged device (150).

In some embodiments, the media output (154) is configured to generate (e.g., multi-channel, etc.) rendering data (160) based on the one or more geo-referenced media content elements. The rendering data (160) may be used to drive headphones, a display, etc., to produce corresponding sound output and/or video images.

Additionally and/or optionally, in some embodiments, the geo-tagged media device (150) can be configured to perform other operations relating to preprocessing of the geo-referenced media content elements, post-processing of the geo-referenced media content elements, rendering of the geo-referenced media content elements, interacting with the geo-referenced media content elements (e.g., selecting a selectable icon, perform a user action to trigger or stop the playback of a geo-referenced media content element, etc.), etc.

Any of the components depicted (e.g., FIG. 1A, FIG. 1B, etc.) may be implemented as one or more processes and/or one or more IC circuits (e.g., ASICs, FPGAs, etc.), in hardware, software, or a combination of hardware and software.

A geo-tagged media device as described herein can be configured to mix/compose/superimpose media content (e.g., audio, video images, etc.) from one or more geo-referenced media content elements into a final mix/composition/superimposition of media content optimized for the listening or viewing by a user of the geo-tagged media device. The geo-tagged media device may be configured to render a soundscape and/or an image scape in which an audible sound source, a visible figure, a visible object, etc., are accurately positioned and timed based on time-dependent geo positional information in the one or more geo-referenced media content elements decoded from a media data stream (120-1).

In some embodiments, a media content element as described herein may use one or more of a variety of (e.g., non-object-based, object-based, etc.) media data formats in which media content (e.g., audio, video, etc.). A geo-tagged media device can decode media content from media content elements in a media data format and combine (e.g., mixed together, etc.) the received media content at the time of rendering or playback. Individual media data elements may comprise individual media content portions. Apart from an individual media content portion, a media data element may include separate non-media-content data, which, for example, may include geo positional data of sound sources, figures, objects, etc., in the individual media content portions in a three-dimensional space. The geo positional data can be used to enable the creation of complex 2-D or 3-D sound fields and/or 2-D or 3-D image fields at the time of rendering and/or playback of the individual media content portions.

In some embodiments, a cloud-based media content provider system (e.g., 100, etc.) as described herein can replace sounds and/or images of some or all of the real-world objects, real-world characters, real-world stand-in figures, etc., with media content elements (e.g., sounds, images, etc.) representing animation objects, animation characters, etc., based on the collected time-dependent geo locational data with the real-world objects, real-world characters, real-world stand-in figures, etc., in a media experience supported by the cloud-based media content provider system. Additionally, alternatively, or optionally, the media content provider system (100) can superimpose sounds and/or images representing animation objects, animation characters, computer-generated image (CGI), etc., at the times and geo positions of the real-world objects, real-world characters, real-world stand-in figures, etc., based on the collected real-world time-dependent geo locational data with the real-world objects, real-world characters, real-world stand-in figures, etc., in such a media experience.

4. Geo-Tags

Figure 2:
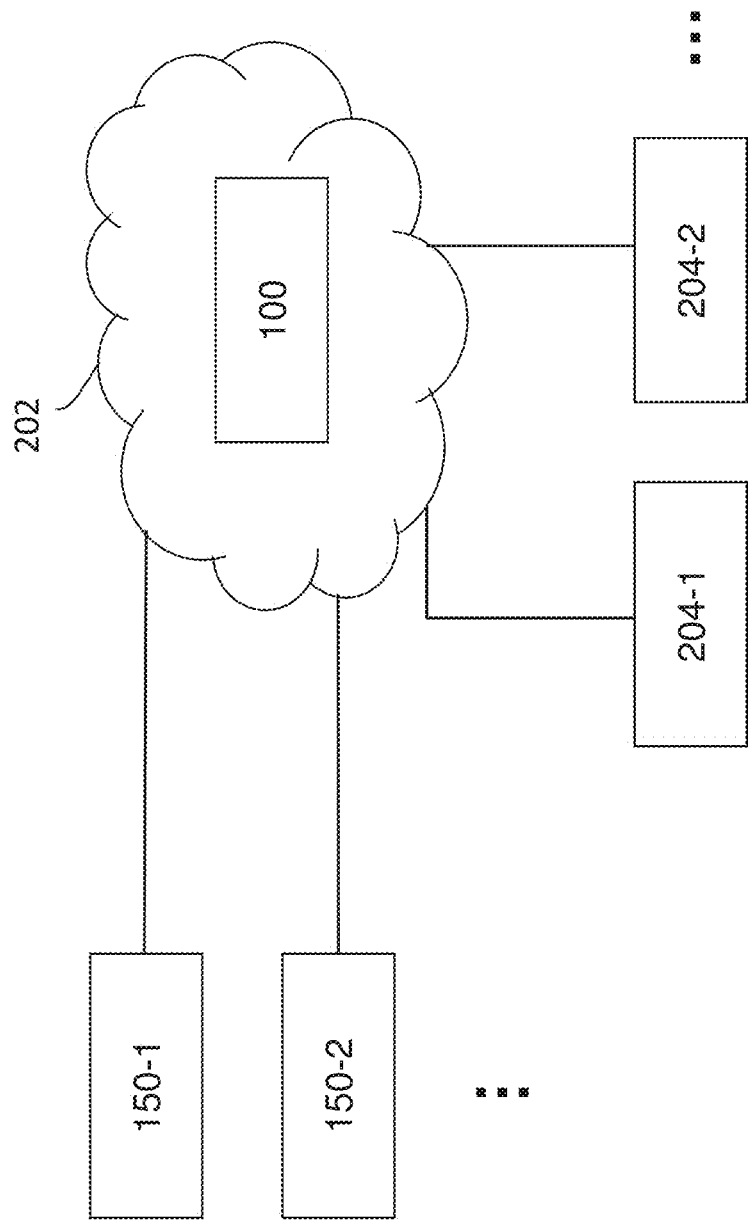
FIG. 2 illustrates an example cloud-based media content provider system in a network cloud with other networked devices.

FIG. 2 illustrates an example cloud-based media content provider system (e.g., 100 of FIG. 1A, etc.) in a network cloud 202 with other networked devices. The media content provider system (100) can interact with users through one or more interconnected systems (e.g., 204-1, 204-2, etc.), computer applications (e.g., social network applications, Twitter applications, Facebook applications, YouTube applications, etc.), etc., and allow the users to compose, modify, send, upload, store, etc., geo-tagged media content elements, for example, via a geo-tagged content generation interface (e.g., 114 of FIG. 1A, etc.). The geo-tagged media content elements can be stored in a geo-tagged content repository (e.g., 110 of FIG. 1A, etc.), and used by the cloud-based media content provider system (100) to provide media experiences to one or more users through the users' geo-tagged media devices (e.g., 150-1, 150-2, etc.).

In some embodiments, an interconnected system (e.g., 204-1, 204-2, etc.) used to generate geo-tagged media content elements may be the same as a geo-tagged media device (e.g., 150-1, 150-2, etc.).

In an example, via a social networking application running on a mobile device (e.g., 204-1, etc.), a person may upload to the cloud-based media content provider system (100) a geo-tagged media content element representing an affectionate message for the person's spouse at or near a location the spouse passes by on a particular day of week. In another example, using a computer program running on a desktop computer (e.g., 204-2, etc.), a parent may upload to the cloud-based media content provider system (100) a geo-tagged media content element representing a greeting or a reminder for a child who is traveling at or near a remote location on a trip.

A geo tag in a geo-tagged media content element may or may not specify a precise geo location. In some embodiments, an approximate area is specified by a geo tag. In response to the cloud-based media content provider system (100) determining that a user is in the approximate area based on geo locational data collected from a geo-tagged media device (e.g., 150-1, etc.) with the user, the cloud-based media content provider system (100) can select one or more geo-tagged media content elements with the geo tag and stream the geo-tagged media content elements to the geo-tagged media device (150-1 in the present example) with the user.

In some embodiments, a geo-tag may specify zero, one or more selection criteria with or without any geo locational information. In an example, a geo tag may specify a selection criterion with which a commercial ad representing warm clothing may become a selectable geo-tagged media content element if a clothing store is detected nearby and if the temperature drops below a certain value. In another example, a geo tag may specify a selection criterion with which a commercial ad representing a café shop may become a selectable geo-tagged media content element if the café shop is detected nearby and if physiological data collected from a user's geo-tagged media device indicates that the user may be interested in taking a break. In response to the cloud-based media content provider system (100) determining that one or more selection criteria are satisfied based on geo locational data and/or non-locational sensor data collected from a geo-tagged media device (e.g., 150-2, etc.) with the user, the cloud-based media content provider system (100) can select one or more geo-tagged media content elements with the geo tag and stream the geo-tagged media content elements to the geo-tagged media device (150-2 in the present example) with the user.

5. Rendering of Geo-Referenced Media Content

In some embodiments, a geo-referenced media content element is presented to a user (e.g., 306 of FIG. 3A, etc.) in a manner that is consistent with the user's respective geo locations, (e.g., head, etc.) orientations, etc. The position at which media content from a geo-tagged media content element is rendered may be dynamically determined and may vary relative to the user's geo origination data (e.g., geo location, orientation, etc.) and non-locational sensor data collected from the geo-tagged media device. Dynamically changing positions for rendering media content in geo-referenced media content elements may be (e.g., coherently, etc.) determined by the cloud-based provider device and provided to geo-tagged media devices in geo-referenced media content elements corresponding to or generated from the geo-tagged media content elements.

As illustrated in FIG. 3A, the user (306) walks from a first geo location 302-1, to a second geo location 302-2 (e.g., near a landmark such as the Eiffel Tower, etc.), and then to a third geo location 302-3. For the purpose of illustration, a geo-tagged media content element representing a tourist guide 304 is stored at a geo-tagged content repository (e.g., 110 of FIG. 1A) of a cloud-based media content provider (e.g., 100 of FIG. 1A, etc.) and has a geo tag that specifies an approximation area that causes the geo-tagged media content element to become selectable in response to receiving geo locational data and/or non-locational sensor data (e.g., from the user's geo-tagged media device, etc.) that indicates the user is at the first geo location 302-1. As the user is walking, the media content provider system (100) receives geo origination data and/or non-locational sensor data (e.g., as functions of time, etc.), generates geo-referenced rendering data based on the geo tag and the geo origination data and/or non-locational sensor data, generates a geo-referenced media content element that includes the geo-referenced rendering data and media content data (e.g., audio data, audiovisual data, etc.) from the geo-tagged media content element, streams the geo-referenced media content element to the user's geo-tagged media device, etc. The geo-referenced media content element that comprises media content data as a function of time may be rendered at the user's media device.

In some embodiments, as the user walks from the first geo location 302-1 to the second geo location 302-2, (e.g., 2-D, 3-D, etc.) sound of the media content element rendered based on the geo-referenced media content element may become louder, (e.g., 2-D, 3-D, etc.) and images from the geo-referenced media content element may become larger. As the user turns, the sound and images may change in relation to the user's geo location and (e.g., head, etc.) orientation accordingly. As the user walks away from the geo location specified for the media content element, the sound from the media content element may become less loud, and the images from the media content element may become smaller. At some point at which the media content element is sufficiently away from the user, the media content element may be abstracted with a symbol on a display (e.g., a bubble on a wearable eye glass display, etc.) viewable by the user.

6. Geo-Referenced Rendering Data

Generating geo-referenced rendering data in geo-referenced media content elements—as generated from corresponding geo-tagged media content elements, geo origination data, non-locational sensor data, etc.—may include but is not limited to: any of determining whether any, some, or all of media data in the geo-referenced media content elements should be rendered on the geo-tagged media device; specifying/setting positions and/or orientations of the geo-referenced media content elements relative to those of the geo-tagged media device, determining audio or audiovisual characteristics (e.g., sound frequency changes as related to Doppler effect, luminance/color changes, etc.) as related to the respective velocities of the geo-referenced media content elements and the geo-tagged media device, etc.

Different geo-referenced rendering data (e.g., in terms of positions, orientations, audio or audiovisual characteristics, etc.), and thus different geo-referenced media content elements, may be generated from the same geo-tagged media content elements based on different geo origination data (e.g., different geo locations of the same user, same or different geo locations of two different users, different orientations of the same user, same or different orientations of two different users, etc.). For example, in a group media experience, a common set of geo-tagged media content elements may be selected for more than one user. For each individual user, different individual geo-referenced rendering data may be generated from the same set of geo-tagged media content elements.

In some embodiments, the geo-referenced rendering data comprises or captures a number of rendering relationships among different entities such as geo-tagged media content elements (or media content therein), users, devices, user actions, external conditions, etc. Examples of rendering relationships captured in the geo-referenced rendering data may include but are not limited to: any of rendering relationships i) among different geo-tagged media content elements; ii) between geo-tagged media content elements and a set of potential user actions; iii) between geo-tagged media content elements and external data; etc.

Rendering relationships among geo-tagged media content elements include, but are not limited to, element bindings (e.g. provide/select geo-tagged media content element A any time that geo-tagged media content element B is provided/selected, etc.), element sequencer (e.g. provide/select geo-tagged media content element A always after providing geo-tagged media content element B), complex logic relationships (e.g. play randomly any of "glass breaking" audio elements when the position of a geo-referenced media content corresponding to a geo-tagged media content element A, a bullet, is coincident with the space occupied by another geo-referenced media content corresponding to geo-tagged media content element B, a window, etc.), etc. In some embodiments, the rendering relationships among different media content elements can be hierarchical and represented by complex directed graphs.

Figure 3B:
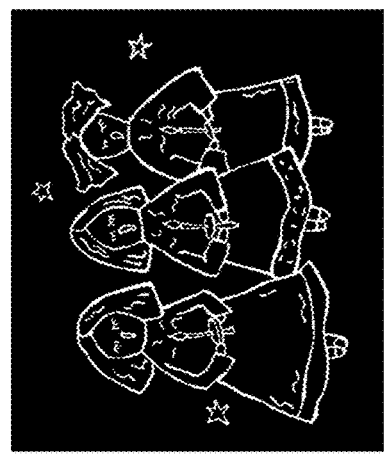
Figure 3B:
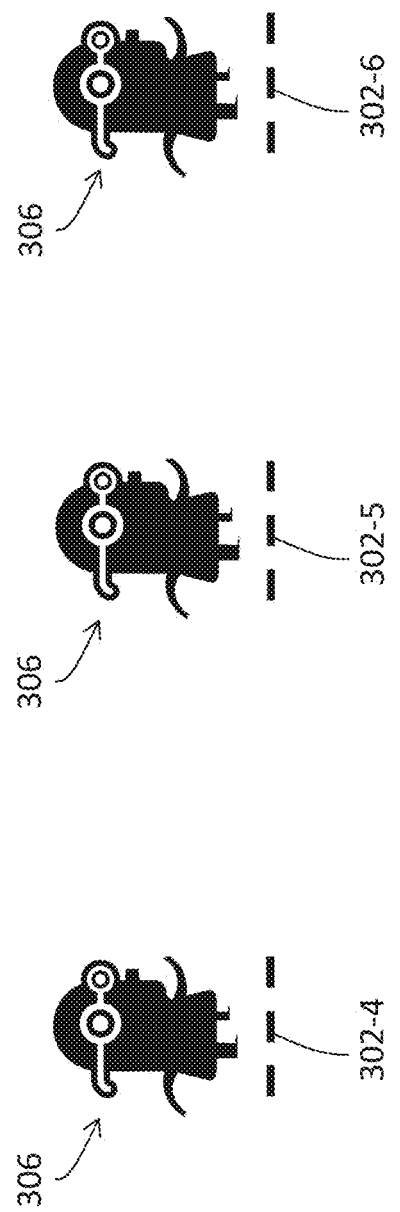

In an example as illustrated in FIG. 3B, at a park, geo-referenced media content elements—generated from cloud-stored geo-tagged media content elements, geo origination data, non-locational sensor data, etc.—that represent three singers 308 on a stage in the park may be downloaded to and rendered on a user's geo-tagged media device. As the user moves about the park (e.g., at different geo locations 302-4, 302-5, 302-6, etc.), the positions, orientations, audio or audiovisual characteristics of the three singers (308) may be coherently changed in relation to the user's positional and/or orientation changes while the geo-referenced media content elements are being rendered in relation to geo origination data received from the user's media device, in order to make the three singers (308) to appear as if they are a part of the live scene at the park to the user.

Rendering relationships between geo-tagged media content elements and a set of potential user actions may include but are not limited to: any of modifying one or more positions of one or more of geo-referenced media content elements corresponding to the geo-tagged media content elements when one or more users interact with the geo-referenced media content elements, etc. In an example, if a user hits a geo-referenced media content corresponding to a geo-tagged media content element A, which represents a dog (e.g., the hit is detected by the user waving a media device close to the position of element A, etc.), then the geo-referenced media content element plays while the position of the geo-referenced media content element is modified to simulate that the dog runs away. In another example, a user may point with a geo-tagged media device to a billboard at a park that shows an ad for the next Spiderman movie to trigger rendering geo-referenced media content elements corresponding to geo-tagged media content elements that represent flying spider men on a display viewable by the user. The user may be presented with a media experience of moving through the flying spider men as the user walks in the park. Thus, geo-referenced rendering data as described herein can not only be dynamically generated in response to and based on received geo-origination data, but also dynamically used in actual rendering, for example, depending on actions previously, contemporaneously, prospectively, etc., taken by a user at a particular geo location.

Rendering relationships between geo-tagged media content elements and external data may include but are not limited to: any of dependency relationships between the geo-tagged media content elements and users' physiological or environmental conditions such as heartbeat, temperature, weather, ambient light conditions, particular day of week, particular time of day, particular days of year, etc. In an example, when the temperature at a particular geo location (e.g., of a geo-tagged media device, etc.) is above a value T, media content in geo-tagged media content elements A, B, C, etc., that corresponds to sounds and/or images of soft drink ads is to be selected for playing instead of media content in geo-tagged media content elements D, E, F, etc., that corresponds to hot tea commercials. In another example, when it is winter time, media data in geo-tagged media content elements relating to ads for winter gloves, warm clothing, etc., may be included in geo-referenced media content elements downloaded to a user's media device, rendered on a display viewable by the user, made available for the user to select for rendering on the user's media device, etc. These geo-tagged media content elements might not be selected if it were summer. In an example, a user's physiological data as measured by sensors with the user's media device may indicate that the user is currently of a physiological condition that a break at a café can be timely, geo-tagged media content elements that provide suggestions of places for relaxation such as cafés, parks, dancing halls, etc. may be selected for generating corresponding geo-referenced media content elements to be downloaded to the user's media device, rendered on a display viewable by the user, made available for the user to select for rendering, etc.

In some embodiments, a set of geo-tagged media content elements are assigned to a group media experience in which multiple users can participate. Examples of group media experience may include but are not limited to: any of group based games, group dancing, group singing, etc. In some embodiments, one or more geo-referenced media content elements may be generated live from media feeds received from geo-tagged media devices of the users. For example, geo-referenced media content elements representing other users may be streamed to a user along with geo-referenced media content elements generated from geo-tagged media content elements that represent start athletes, famous players, game caricatures, famous personalities, etc. Geo-referenced media content elements can be streamed to the set of users according to the users' respective actions, as determined from sensors in the users' media devices. In some embodiments, the streamed media content elements are rendered by the media devices to the users' displays using 2-dimensional (2-D) or 3-dimensional (3-D) display techniques and/or to the users' head-phones using 2-D or 3-D audio techniques (e.g., binaural technologies, etc.) in a manner that the geo-referenced media content elements are perceived by each of the users as being rendered at perceptually correct positions relative to each user's respective position and/or (e.g., head, etc.) orientation. In some embodiments, to generate corresponding geo-referenced media content elements, visual characteristics, loudness levels, etc., as configured in cloud-stored geo-tagged media content elements can be modified based on geo origination data, non-locational sensor data, etc., to produce/portray correct object-to-user distances, correct object-to-user motions, etc.

7. Example Process Flows

Figure 4A:
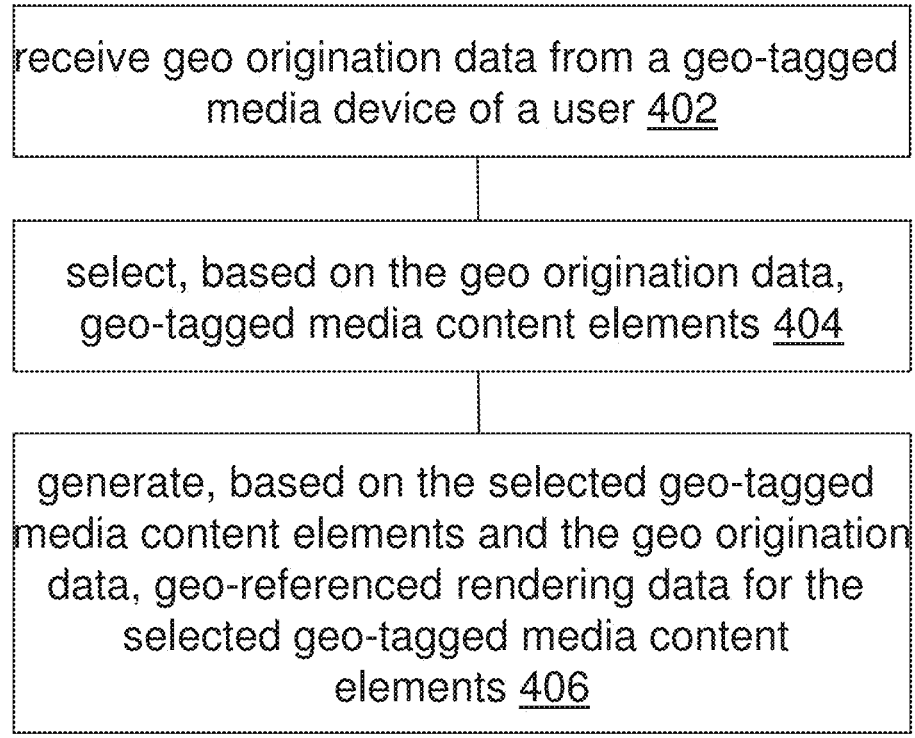
FIG. 4A and FIG. 4B illustrate example process flows.
Figure 4B:
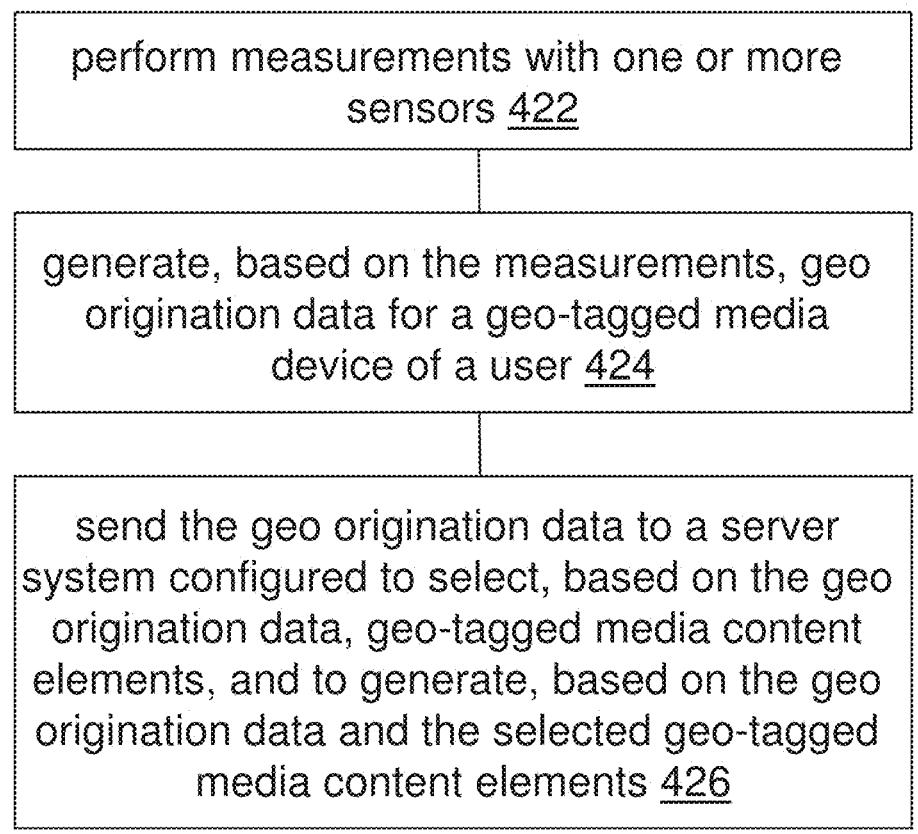

FIG. 4A and FIG. 4B illustrate example process flows. In some embodiments, one or more computing devices or units in a media processing system may perform this process flow.

FIG. 4A illustrates an example process flow that may be implemented by a cloud-based media content provider system (e.g., 100 of FIG. 1A, etc.) as described herein. In block 402 of FIG. 4A, the media content provider system (100) receives geo origination data from a geo-tagged media device of a user.

In block 404, based at least in part on the geo origination data, the media content provider system (100) selects one or more geo-tagged media content elements from a plurality of geo-tagged media content elements.

In block 406, based at least in part on the one or more selected geo-tagged media content elements and the geo origination data, the media content provider system (100) generates geo-referenced rendering data for the one or more selected geo-tagged media content elements. The geo-referenced rendering data is to be used for rendering media content from the one or more selected geo-tagged media content elements perceivable to the user of the geo-tagged media device. In an embodiment, these steps are performed by a cloud-based media content provider system.

In an embodiment, the media content provider system (100) is further configured to perform: receiving non-locational sensor data from the geo-tagged media device; selecting, based at least in part on the non-locational sensor data, one or more second geo-tagged media content elements from the plurality of geo-tagged media content elements; generating, based at least in part on the one or more second selected geo-tagged media content elements and the non-locational sensor data, second geo-referenced rendering data for the one or more second selected geo-tagged media content elements, the second geo-referenced rendering data to be used for rendering second media content from the one or more second selected geo-tagged media content elements perceivable to the user of the geo-tagged media device; etc.

In an embodiment, the one or more geo-tagged media content elements comprises at least one geo-tagged media content element of the one or more second geo-tagged media content elements.

In an embodiment, at least one geo-tagged media content element of the one or more second geo-tagged media content elements comprises one or more pre-configured rendering properties; and the second geo-referenced rendering data comprises at least one pre-configured rendering property of the one or more pre-configured rendering properties as modified based at least in part on the non-locational sensor data.

In an embodiment, the non-locational sensor data comprises one or more of audio feeds, video feeds, physical measurements, optical measurements, or physiological measurements.

In an embodiment, at least one geo-tagged media content element of the one or more geo-tagged media content elements comprises one or more pre-configured rendering properties; and the geo-referenced rendering data comprises at least one pre-configured rendering property, of the one or more pre-configured rendering properties, as modified based at least in part on the geo origination data.

In an embodiment, the geo origination data comprises one or more of geo locations, orientations, speeds, velocities, accelerations, rotations, or vibrations.

In an embodiment, the media content provider system (100) is further configured to generate one or more geo-referenced media content elements that include the geo-referenced rendering data and media content from the one or more selected geo-tagged media content elements. In an embodiment, the media content provider system (100) is further configured to cause the one or more geo-referenced media content elements to be streamed to and rendered with the geo-tagged media device. In an embodiment, the media content provider system (100) is further configured to perform: rendering the one or more geo-referenced media content elements into one or more media frame at a cloud-based server; encoding the one or more media frames that have rendered the one or more geo-referenced media content elements into a media data stream; transmitting the media data stream from the cloud-based server to the geo-tagged media device; etc.

In an embodiment, a media data stream is used to stream the geo-referenced rendering data as metadata and media content from the one or more geo-tagged media content elements; and wherein the metadata in the media data stream is separate from the media content in the media data stream.

In an embodiment, the geo-referenced rendering data and the media content are formatted into one or more media content objects encoded in a media data stream to the geo-tagged media device.

In an embodiment, the geo-referenced rendering data comprises one or more rendering relationships among different entities; and wherein the different entities include two or more of geo-tagged media content elements, users, media devices, user actions, or external conditions. In an embodiment, the one or more rendering relationships include at least one rendering relationship among different geo-tagged media content elements in the selected one or more geo-tagged media content elements. In an embodiment, the one or more rendering relationships include at least one rendering relationship between a set of potential user actions and at least one of the one or more geo-tagged media content elements. In an embodiment, the one or more rendering relationships include at least one rendering relationship between external data and at least one of the one or more geo-tagged media content elements.

In an embodiment, the media content provider system (100) is further configured to perform: receiving second geo origination data from a second geo-tagged media device of a second user; generating, based at least in part on the one or more selected geo-tagged media content elements and the second geo origination data, second geo-referenced rendering data for the one or more selected geo-tagged media content elements, the geo-referenced rendering data to be used for rendering media content from the one or more selected geo-tagged media content elements perceivable to the second user of the second geo-tagged media device; etc. In an embodiment, the geo-tagged media device and the second geo-tagged media device are operated by the user and the second user, respectively, in a single group media experience. In an embodiment, the user and the second user are located in the same geographic area. In an embodiment, the user and the second user are located in two different geographic areas.

In an embodiment, at least one geo-tagged media content element is stored at a cloud-based content repository.

In an embodiment, at least one geo-tagged media content element is constructed from a media content feed received from a geo-tagged media device.

FIG. 4B illustrates an example process flow that may be implemented by a geo-tagged media device (e.g., 150 of FIG. 1B, etc.) as described herein. In block 422 of FIG. 4B, the geo-tagged media device (150) performs measurements with one or more sensors.

In block 424, the geo-tagged media device (150) generates, based on the measurements, geo origination data for a geo-tagged media device of a user.

In block 426, the geo-tagged media device (150) sends the geo origination data to a server system. The server system is configured to select, based at least in part on the geo origination data, one or more geo-tagged media content elements, and to generate, based at least in part on the geo origination data and the one or more selected geo-tagged media content elements, geo-referenced rendering data for the one or more selected geo-tagged media content elements. The geo-referenced rendering data to be used for rendering media content from the one or more selected geo-tagged media content elements perceivable to the user of the geo-tagged media device. In an embodiment, these steps are performed by the geo-tagged media device.

In an embodiment, the geo-tagged media device (150) is further configured to perform: generating, based on the measurements, non-locational sensor data for the geo-tagged media device of a user; sending the non-locational sensor data to the server system; etc.

In an embodiment, the geo-tagged media device (150) is further configured to receive one or more geo-referenced media content elements that include the geo-referenced rendering data and media content from the one or more selected geo-tagged media content elements.

In an embodiment, the geo-tagged media device (150) is further configured to receive one or more video frames in to which media content from the one or more selected geo-tagged media content elements has been rendered based at least in part on the geo-referenced rendering data.

In an embodiment, the geo-tagged media device (150) is further configured to decode the geo-referenced rendering data as metadata from an input media data stream, and decoding media content of the one or more geo-tagged media content elements from the same input media data stream.

In an embodiment, the geo-tagged media device (150) is further configured to send to the server system a media content feed for constructing at least one geo-referenced media content element to be rendered at one or more geo-tagged media devices.

In an embodiment, an apparatus comprising a processor and configured to perform any one of the methods as described herein.

In an embodiment, a non-transitory computer readable storage medium, comprising software instructions, which when executed by one or more processors cause performance of any one of the methods as described herein. Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, wearable computing devices, networking devices or any other device that incorporates hard-wired and/or program logic to implement the techniques.

Figure 5:
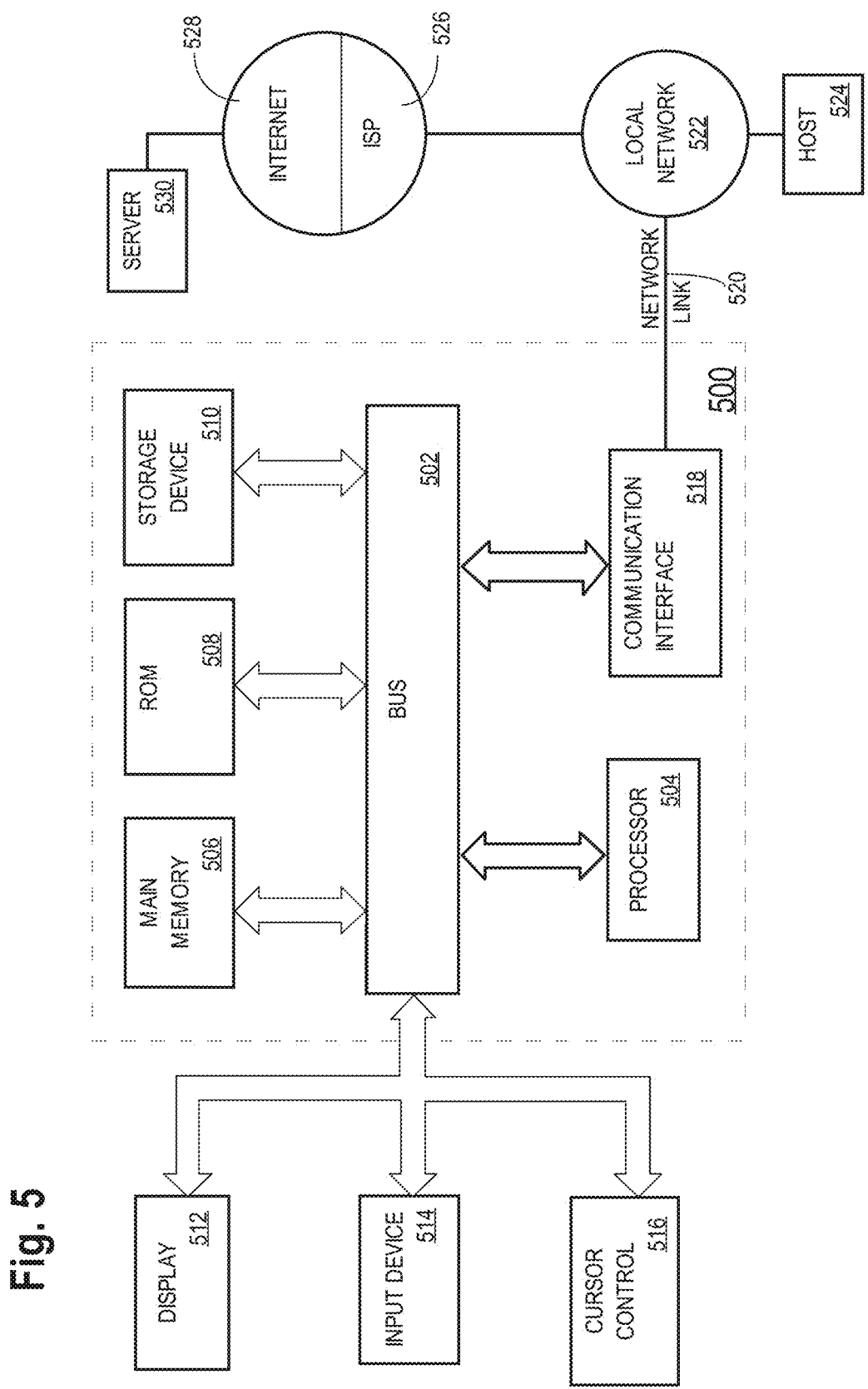
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, feature, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving geo origination data and non-locational sensor data from a geo-tagged media device of a user;
   selecting, based at least in part on the geo origination data, one or more geo-tagged media content elements from a plurality of geo-tagged media content elements;
   generating, based at least in part on the one or more selected geo-tagged media content elements and the geo origination data, geo-referenced rendering data for the one or more selected geo-tagged media content elements, the geo-referenced rendering data to be used for rendering media content from the one or more selected geo-tagged media content elements perceivable to the user of the geo-tagged media device;
   selecting, based at least in part on the non-locational sensor data, one or more second geo-tagged media content elements from the plurality of geo-tagged media content elements;
   generating, based at least in part on the one or more second selected geo-tagged media content elements and the non-locational sensor data, second geo-referenced rendering data for the one or more second selected geo-tagged media content elements, the second geo-referenced rendering data to be used for rendering second media content from the one or more second selected geo-tagged media content elements perceivable to the user of the geo-tagged media device;
   wherein the method is performed by one or more computing devices.

2. The method of claim 1, wherein the method is performed by a cloud-based media content provider system.

3. The method of claim 1, wherein the one or more geo-tagged media content elements comprises at least one geo-tagged media content element of the one or more second geo-tagged media content elements.

4. The method of claim 1, wherein at least one geo-tagged media content element of the one or more second geo-tagged media content elements comprises one or more pre-configured rendering properties; and wherein the second geo-referenced rendering data comprises at least one pre-configured rendering property of the one or more pre-configured rendering properties as modified based at least in part on the non-locational sensor data.

5. The method of claim 1, wherein at least one geo-tagged media content element of the one or more geo-tagged media content elements comprises one or more pre-configured rendering properties; and wherein the geo-referenced rendering data comprises at least one pre-configured rendering property, of the one or more pre-configured rendering properties, as modified based at least in part on the geo origination data.

6. The method of claim 1, further comprising generating one or more geo-referenced media content elements that include the geo-referenced rendering data and media content from the one or more selected geo-tagged media content elements.

7. The method of claim 6, further comprising:
   analyzing non-locational data and the geo origination data collected from the geo-tagged media device to determine one or more actions of the user; and
   modifying at least one of the one or more geo-referenced media content elements based on the one or more actions of the user.

8. The method of claim 6, further comprising causing the one or more geo-referenced media content elements to be streamed to and rendered with the geo-tagged media device.

9. The method of claim 6, further comprising:
   rendering the one or more geo-referenced media content elements into one or more media frame at a cloud-based server;
   encoding the one or more media frames that have rendered the one or more geo-referenced media content elements into a media data stream;
   transmitting the media data stream from the cloud-based server to the geo-tagged media device.

10. The method of claim 1, wherein a media data stream is used to stream the geo-referenced rendering data as metadata and media content from the one or more geo-tagged media content elements; and wherein the metadata in the media data stream is separate from the media content in the media data stream.

11. The method of claim 1, wherein the geo-referenced rendering data and the media content are formatted into one or more media content objects encoded in a media data stream to the geo-tagged media device.

12. The method of claim 1, wherein the geo-referenced rendering data comprises one or more rendering relationships among different entities; and wherein the different entities include two or more of geo-tagged media content elements, users, media devices, user actions, or external conditions.

13. The method of claim 12, wherein the one or more rendering relationships include at least one rendering relationship among different geo-tagged media content elements in the selected one or more geo-tagged media content elements.

14. The method of claim 1, further comprising:
   receiving second geo origination data from a second geo-tagged media device of a second user;
   generating, based at least in part on the one or more selected geo-tagged media content elements and the second geo origination data, second geo-referenced rendering data for the one or more selected geo-tagged media content elements, the geo-referenced rendering data to be used for rendering media content from the one or more selected geo-tagged media content elements perceivable to the second user of the second geo-tagged media device.

15. The method of claim 1, wherein at least one geo-tagged media content element is stored at a cloud-based content repository.

16. The method of claim 1, wherein at least one geo-tagged media content element is constructed from a media content feed received from a geo-tagged media device.

17. A method, comprising:
   performing measurements with one or more sensors;
   generating, based on the measurements, geo origination data and non-locational sensor data for a geo-tagged media device of a user;

sending the geo origination data and the non-locational sensor data to a server system configured to select, based at least in part on the geo origination data, one or more geo-tagged media content elements, and to generate, based at least in part on the geo origination data and the one or more selected geo-tagged media content elements, geo-referenced rendering data for the one or more selected geo-tagged media content elements, the geo-referenced rendering data to be used for rendering media content from the one or more selected geo-tagged media content elements perceivable to the user of the geo-tagged media device;

wherein the server system is further configured to select, based at least in part on the non-locational sensor data, one or more second geo-tagged media content elements, and to generate, based at least in part on the non-locational sensor data and the one or more selected second geo-tagged media content elements, second geo-referenced rendering data for the one or more selected second geo-tagged media content elements, the second geo-referenced rendering data to be used for rendering media content from the one or more selected second geo-tagged media content elements perceivable to the user of the geo-tagged media device;

wherein the method is performed by one or more computing devices.

18. The method of claim 17, wherein the method is performed by the geo-tagged media device.

19. The method of claim 17, further comprising:
generating, based on the measurements, non-locational sensor data for the geo-tagged media device of a user;
sending the non-locational sensor data to the server system.

20. The method of claim 17, further receiving one or more geo-referenced media content elements that include the geo-referenced rendering data and media content from the one or more selected geo-tagged media content elements.

21. The method of claim 17, further comprising receiving one or more video frames in to which media content from the one or more selected geo-tagged media content elements has been rendered based at least in part on the geo-referenced rendering data.

22. The method of claim 17, further comprising decoding the geo-referenced rendering data as metadata from an input media data stream, and decoding media content of the one or more geo-tagged media content elements from the same input media data stream.

23. The method of claim 17, wherein the geo-referenced rendering data comprises one or more rendering relationships among different entities; and wherein the different entities include two or more of geo-tagged media content elements, users, media devices, user actions, or external conditions.

24. The method of claim 17, further comprising sending to the server system a media content feed for constructing at least one geo-referenced media content element to be rendered at one or more geo-tagged media devices.

25. A non-transitory computer readable medium storing computer instructions which, when executed by one or more computing processors, cause the one or more computing processors to perform the method of claim 1.

26. A non-transitory computer readable medium storing computer instructions which, when executed by one or more computing processors, cause the one or more computing processors to perform the method of claim 17.

27. An apparatus comprising:
one or more computing processors;
a non-transitory computer readable medium that stores computer instructions which,
when executed by the one or more computing processors, cause the one or more computing processors to perform the method of claim 1.

28. An apparatus comprising:
one or more computing processors;
a non-transitory computer readable medium that stores computer instructions which,
when executed by the one or more computing processors, cause the one or more computing processors to perform the method of claim 17.

* * * * *